Sept. 29, 1964   G. C. WALLIS, JR   3,150,539
CONTROL CABLE CLAMP
Filed Dec. 19, 1960   2 Sheets-Sheet 1
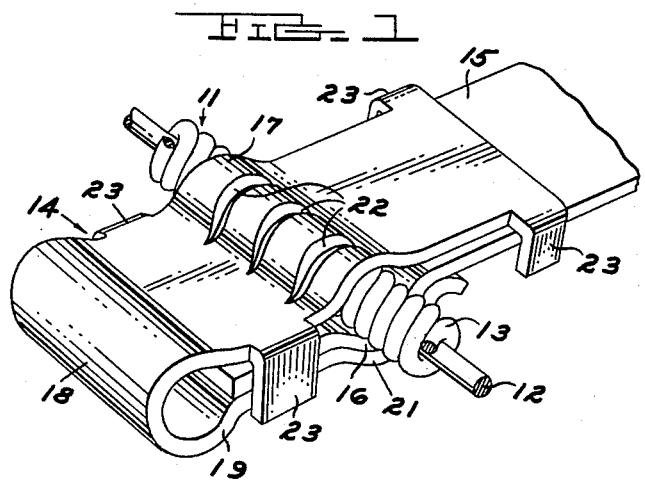
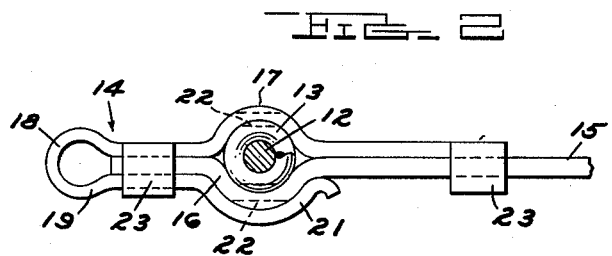
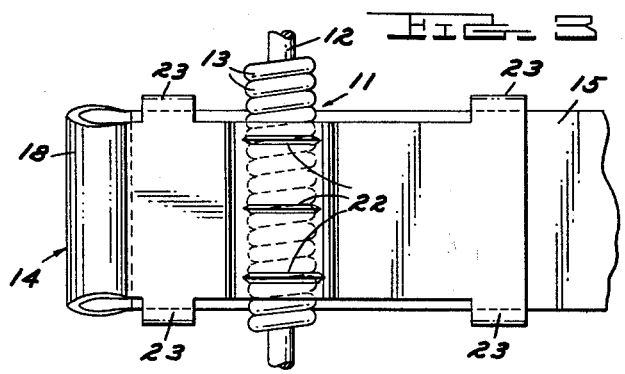
GEORGE C. WALLIS, JR.
INVENTOR.
BY J. R. Faulkner
J. J. Roethel
ATTORNEYS Sept. 29, 1964    G. C. WALLIS, JR    3,150,539
CONTROL CABLE CLAMP
Filed Dec. 19, 1960    2 Sheets-Sheet 2
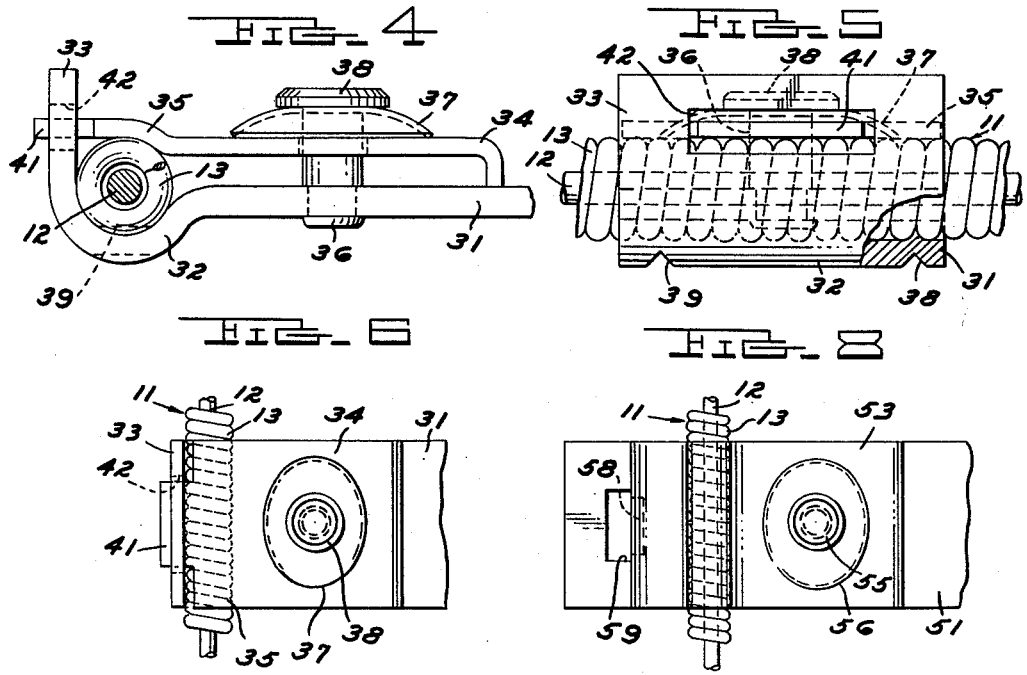
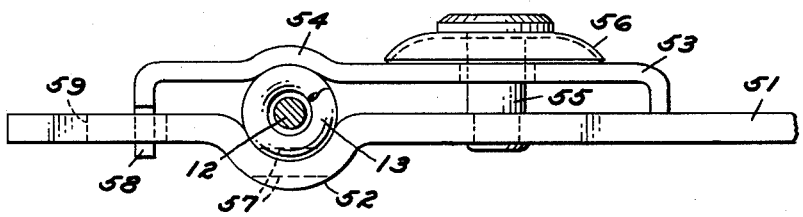
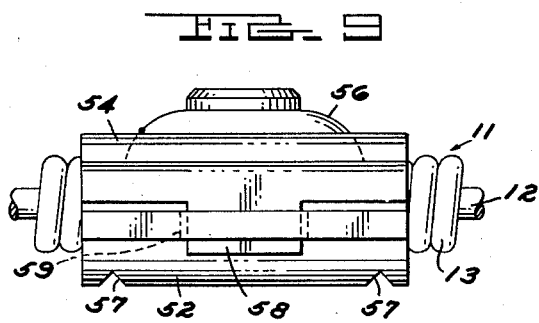
GEORGE C. WALLIS, JR.
INVENTOR.
BY
J. R. Faulkner
J. J. Roethel
ATTORNEYS

United States Patent Office 3,150,539
Patented Sept. 29, 1964

3,150,539
CONTROL CABLE CLAMP
George C. Wallis, Jr., Livonia, Mich., assignor to Ford Motor Company, Dearborn, Mich., a corporation of Delaware
Filed Dec. 19, 1960, Ser. No. 76,630
4 Claims. (Cl. 74—501)

This invention relates to control cable assemblies and more particularly to a clamping device for attaching control cables to a supporting member.

It is frequently desirable and necessary to provide some way in which the position of a member may be controlled from a remote station. An example of such an installation may be found in the control arrangement of motor vehicle heating and ventilating systems. In vehicular ventilating systems the air flow through the various ducts is regulated by ventilator control doors which are generally located at points removed from the control panel. These systems conventionally utilize some form of mechanical motion transmisson devices to allow the position of the ventilator doors to be controlled from knobs or levers located on the dash board.

The most common motion transmitting device utilized in this type of control arrangement is the Bowden wire cable. This familiar device consists of a wire actuator surrounded by a flexible protective sheath. To promote ease of operation of the control by eliminating binding of the cable, the protective sheath is clamped to a stationary supporting device. The heater control bracket is an example of a support which is conventionally utilized.

In an installation of the type described, the physical location of the end of the protective sheath of the Bowden wire can be critical. Should the lower sheath end be located too close to the point of attachment of the wire actuator to the vent door, it will interfere with the operation of the door by limiting the movement of the latter to something less than the desired fully opened position. In a like manner, placement of the upper sheath end too close to the point of attachment of the wire actuator to the control lever will make it impossible to fully close the door. It is, therefore, essential that the protective sheath be correctly located during assembly. This necessitates a "cut and try" installation procedure. Inasmuch as the cable clamps conventionally employed rigidly secure the sheath relative to a supporting member, successive loosening and reassembly operations are required to accurately locate the cable.

To permit quick but positive assembly it is an object of this invention to provide a cable clamp which will hold the protective sheath of a Bowden wire cable with sufficient rigidity to allow operation of the actuator while accommodating easy position adjustment of the sheath during assembly without the necessity of successive loosening and tightening operations. These ends are accomplished by the provision of a clamp which coacts with the protective sheath to resist any tendency for the sheath to move relative to its support under the influence of normal axial actuating loads imposed upon the wire actuator. Construction of the clamp, however, is such that the exertion of a greater than normal axial load imposed upon the actuator will allow the clamp to yield freeing the protective sheath to seek a new position.

In the specific control arrangement previously mentioned consider the condition in which it is discovered during assembly that the position of the protective sheath interferes with the opening actuation of the ventilator door. This condition is generally caused by premature contact of the connection at the terminal end of the actuator to the vent door with the adjacent end of the protective sheath. This will block further movement of the door. During the initial movement of the door the tendency for the protective sheath to move due to the friction between the wire actuator and the sheath has been resisted by the clamp. To adjust the position of the sheath a greater than normal load is exerted upon the control lever. This causes the clamp to yield freeing the sheath to seek a new position in which it will not interfere with full movement of the ventilator door. When the additional force is relaxed the clamp will secure the sheath in its new positions. If it is discovered that the position of the sheath interferes with the closing actuation of the ventilator the position of the sheath may be adjusted in a similar manner. When the connection between the wire actuator and the control lever comes into premature contact with the adjacent end of the sheath, exertion of sufficient force upon the lever will cause the clamp to yield. The sheath may then move to a position which will allow the door to completely close. The clamp will then secure the sheath in its new position.

Further objects and advantages of the invention will become more apparent as this description proceeds particularly when considered in conjunction with the accompanying drawings in which:

FIGURE 1 is a perspective view of an embodinment of the invention.

FIGURE 2 is a side elevational view of the embodiment of FIGURE 1.

FIGURE 3 is a top plan view of the embodiment of FIGURE 1.

FIGURE 4 is a side elevational view of another embodiment of the invention.

FIGURE 5 is a front elevational view of the embodiment of FIGURE 4.

FIGURE 6 is a top plan view of the embodiment of FIGURE 4.

FIGURE 7 is a side elevational view of a further embodiment of the invention.

FIGURE 8 is a top plan view of the embodiment of FIGURE 7.

FIGURE 9 is a front elevational view of the embodiment of FIGURE 7.

Referring now in detail to the drawing and in particular to the embodiment of FIGURES 1–3, there is shown generally at 11 a Bowden wire cable. Bowden wire cable 11 consists of a wire actuator 12 and a surrounding flexible protective sheath 13. As is conventional, sheath 13 may be formed of a spirally wound wire resulting in spiral grooves or indentations being formed along its outer surface. The wire actuator 12 will be connected at one of its ends to a control member by any suitable method. In a like manner, the other end of wire 12 will be connected to the element to be controlled.

Axial movement of wire 12 tends to draw the protective sheath in the same direction due to the frictional forces exerted along the surface at which wire 12 contacts sheath 13. It is conventional to provide a clamp or clamps which, through coaction with the protective sheath, positively locate the sheath relative to a supporting member and prevent binding of the wire actuator within the sheath. It is to such a clamp that this invention relates. One physical form which the clamp of this invention may take is generally indicated as at 14. Clamp 14 coacts with the stationary support member 15 to locate sheath 13 in the manner to be described.

Stationary member 15 is formed with an arcuate portion 16 which encircles one side of the protective sheath 13. Clamp 14 has a first arcuate portion 17 which encircles an opposing side of protective sheath 13. Clamp portion 17 extends in a direction generally away from support member 15 and turns under as at 18 to extend into another portion 19 of clamp 14. Portion 19 extends along the side of support member 15 opposite to the side which contacts protective sheath 13. An arcuate section 21 of portion 19 bears against arcuate portion 16 of support member 15.

Clamp 14, when constructed, is formed so that the distance between arcuate portions 17 and 21 is less than the combined width of support member 15 and protective sheath 13. The clamp 14 is formed of a resilient material, for example strip steel, to permit it to be snapped in place over the support member 15 and protective sheath 13. The clamp 14 thus acts as a spring clip to locate protective sheath 13 and support member 15 relative to each other and resist relative movement therebetween. That is, the spring action of portions 19 and 18 of the clamp urge clamp portion 17, protective sheath 13 and support member 15 into mutual contact. Clamp 14 and support member 15 are formed with indended portions 22 which coact with the spiral grooves of the outer surface of protective sheath 13 to provide a more positive retaining force therebetween.

Movement of protective sheath 13 in the direction of movement of wire actuator 12 under the influence of normal control forces exerted thereon is resisted by the clamp member 14. Clamp 14 may be formed with one or more downturned tabs 23 which through contact with support member 15 serve additionally to locate the clamp 14 and resist movement thereof.

To adjust the position of the sheath 13 relative to support member 15 it is unnecessary to remove clamp 14. As has been noted, clamp 14 acts as a spring and when sufficient force is exerted on protective sheath 13 portions 18 and 19 of clamp 14 will yield freeing sheath 13 from the action of clamp 14 allowing sheath 13 to move relative to support member 15.

It may thus be seen that the position of sheath 13 relative to support member 15 may be adjusted merely by exerting sufficient force in the appropriate direction on sheath 13 to overcome the spring resistance of clamp 14. When the adjusting force is released, the sheath 13 will be positively located in its newly adjusted position by the spring action of clamp 14.

Referring now to the embodiment of FIGURES 4–6, the stationary support member 31 is formed with an arcuate portion 32 adjacent the upturned end 33. Arcuate portion 32 receives protective sheath 13 of Bowden wire cable 11. The clamp 34 has a portion 35 thereof which contacts protective sheath 13 along a side opposing contacted by arcuate portion 32 of support 31. A rivet 36 or other similar member extends through holes formed in clamp 34 and support member 31 and serves to locate these elements relative to each other. A Belleville spring 37 is compressed between the head 38 of rivet 36 and a flat portion of clamp 34. The action of spring 37 serves to maintain clamp 34 in contact with protective sheath 13 thus resisting the tendency for sheath 13 to move relative thereto due to the action of normal control forces exerted on wire actuator 12. Support member 31 is formed with indentations 39 which coact with the grooves formed in the outer surface of sheath 13 to assist in maintaining the spatial relation of the elements to each other. It would, of course, be obvious, if so desired, to also form clamp 34.

Adjustment of sheath 13 with respect to support member 31 is accomplished in the same manner as that described relative to the embodiment of FIGURES 1–3. When sufficient force is exerted upon sheath 13, spring 37 will yield allowing sheath 13 to move to the desired position. In order to limit the amount of movement of clamp 34 relative to support member 31 during this operation, end 41 of clamp 34 may extend into a slot 42 formed in the upturned end portion 33 of support member 31.

The embodiment of FIGURES 7–9 is substantially similar to that of FIGURES 4–6. In this embodiment, a stationary support member 51 receives the protective sheath 13 in an arcuate portion 52. A clamp member 53 has an arcuate portion 54 which contacts the protective sheath 13 on the side opposite to that contacted by arcuate portion 52. A rivet 55 or other similar fastening device locates the clamp 53 relative to support member 51. A Belleville spring 56 acts to maintain clamp 53, protective sheath 13 and support member 51 in mutual contact. Support member 51 is formed with indentations 57 to assist in locating sheath 13 in the manner which has been described. Alternatively, clamp 53 may be formed with such indentations.

Adjustment of the location of sheath 13 with respect to support member 51 is accomplished in the manner previously described. In this embodiment movement of clamp 53 relative to support member 51 during the adjusting procedure may be limited by the coaction of the down-turned tab 58 of clamp 53 with the slot 59 of support member 51 into which it extends.

Throughout the description of this device reference has been made to a stationary supporting member. Conventionally, this member may be any stationary part to which it is desired to secure the protective sheath. In the vehicular ventilating system previously mentioned, the stationary supporing member may be the heater or ventilator control bracket. It is, of course, apparent that the element referred to when described the specific embodiments disclosed as a stationary supporting member may, in fact, be a separate part of the clamp device. In this case a suitable portion of the clamp would be secured to a stationary support by means of screws, bolts or other suitable fasteners.

It will be understood that the invention is not to be limited to the exact construction shown and described but that various changes and modifications may be made without departing from the spirit and scope of the invention, as defined by the appended claims.

I claim:

1. In a control cable assembly adapted to apply push-pull actuating loads to a cable controlled device,
   a control cable having a wire actuator and an enveloping protective sheath having grooves formed on the outer surface thereof,
   a support member extending along one side of said protective sheath contiguous thereto,
   clamp means having a portion thereof extending along an opposing side of said protective sheath contiguous thereto,
   one of said clamp means and said support member having means formed thereon coacting with the grooves of said protective sheath,
   and means yieldably urging said last-named means into coaction with said grooves whereby movement of said sheath relative to said clamp means upon the application of normal push-pull actuating forces on said wire actuator is resisted,
   said yieldable means being constructed and arranged to yieldably allow said protective sheath to move axially relative to said clamping means in stepped lineal progression along the line of application of said push-pull actuating loads upon axial application against an end of said protective sheath of a load in excess of that required to operate the cable controlled device,
   thereby allowing movement of said protective sheath relative to said support member for self-adjustment purposes.

2. In a control cable assembly adapted to apply push-pull actuating loads to a cable controlled device,
   a control cable comprising a wire actuator and an enveloping protective sheath having helically extending grooves formed on the outer surface thereof,
   a support member extending along one side of said protective sheath contiguous thereto,
   clamp means having a portion thereof extending along an opposing side of said protective sheath contiguous thereto,
   one of said clamp means and support member having groove engaging means formed thereon,
   and means yieldably urging said groove engaging means into engagement with said grooves to resist movement of said protective sheath relative to said clamp means upon the application of normal axial push-pull actuating forces on said wire actuator, said yieldable means being constructed and arranged to yieldably allow relative displacement one from the other of said groove engaging means and said grooves and thereby movement of said protective sheath axially relative to said clamping means and in stepped lineal progression from groove to groove upon the application of a push or pull load against an end of said protective sheath in excess of that required to operate the cable controlled device, said yieldable means thereby allowing movement of said protective sheath relative to said support member for self-adjustment purposes.

3. In a control cable assembly adapted to apply push-pull actuating loads to a cable controlled device, a control cable comprising a wire actuator and a surrounding protective sheath having grooves formed on the outer surface thereof, a support member extending along one side of said protective sheath contiguous thereto, clamp means having a portion thereof extending along an opposing side of said protective sheath contiguous thereto, one of said clamp means and said support member having means formed thereon coacting with the grooves of said protective sheath whereby axial movement of said sheath relative to said support member upon application of normal push-pull actuating forces to said wire actuator is resisted, said clamp means having a further portion thereof adapted to contact said support member whereby said first named portion and said support member are yieldably urged into abutting relation with said protective sheath, said further clamp portion being constructed and arranged to yieldably allow said protective sheath to move relative to said clamp means and said support member in stepped lineal progression over the grooves along the line of application of said push-pull actuating load upon axial application against an end of said sheath of a load in excess of that required to operate the cable controlled device.

4. In a control cable assembly adapted to apply push-pull actuating loads to a cable controlled device, a control cable comprising a wire actuator and a surrounding protective sheath having indentations formed in the outer surface thereof, a support member extending along one side of said protective sheath contiguous thereto, clamp means having a portion thereof extending along an opposing side of said protective sheath contiguous thereto, one of said clamp means and said support member having a portion thereof coacting with said indentations in said protective sheath whereby movement of said sheath relative thereto under the influence of normal actuating forces on said wire actuator is resisted, said clamp means having a further integral portion thereof adapted to contact said support member whereby said first named portion and said support member are yieldably urged into abutting relation with said protective sheath, means locating said clamp means with respect to said support member, said further integral portion being constructed and arranged to yieldably allow said protective sheath to move relative to said clamp means and said support member in stepped lineal progression over said indentations along the line of application of said push-pull actuating load upon axial application against an end of said sheath of a load in excess of that required to operate the cable control device.

References Cited in the file of this patent

UNITED STATES PATENTS

| | | |
|---|---|---|
| 225,516 | Gates | Mar. 16, 1880 |
| 1,196,087 | Crume | Aug. 29, 1916 |
| 1,384,583 | Wood | July 12, 1921 |
| 1,585,976 | Groves et al. | May 25, 1926 |
| 1,688,214 | Walden | Oct. 16, 1928 |
| 1,791,644 | Sneed | Feb. 10, 1931 |
| 1,818,625 | Hunter | Apr. 11, 1931 |
| 1,996,249 | McCann | Apr. 2, 1935 |
| 2,286,696 | Tinnerman | June 16, 1942 |
| 2,334,706 | Ingalls | Nov. 23, 1943 |
| 2,509,445 | Motis | May 30, 1950 |
| 2,648,351 | Curtis et al. | Aug. 11, 1953 |
| 2,657,443 | Hartman | Nov. 3, 1953 |
| 2,712,917 | Flora et al. | July 12, 1955 |
| 2,869,396 | Heidecke et al. | Jan. 20, 1959 |
| 2,872,793 | Botti | Feb. 10, 1959 |
| 2,886,270 | Wendela | May 12, 1959 |
| 2,892,234 | Klein | June 30, 1959 |
| 2,904,293 | Thompson | Sept. 15, 1959 |

FOREIGN PATENTS

| | | |
|---|---|---|
| 198,810 | Switzerland | Sept. 16, 1938 |